United States Patent
Tetelbaum et al.

(10) Patent No.: US 7,107,558 B2
(45) Date of Patent: Sep. 12, 2006

(54) METHOD OF FINDING CRITICAL NETS IN AN INTEGRATED CIRCUIT DESIGN

(75) Inventors: Alexander Tetelbaum, Hayward, CA (US); Maad A. Al-Dabagh, Sunnyvale, CA (US)

(73) Assignee: LSI Logic Corporation, Milpitas, CA (US)

( * ) Notice: Subject to any disclaimer, the term of this patent is extended or adjusted under 35 U.S.C. 154(b) by 148 days.

(21) Appl. No.: 10/924,531

(22) Filed: Aug. 23, 2004

(65) Prior Publication Data

US 2005/0022145 A1    Jan. 27, 2005

Related U.S. Application Data

(63) Continuation-in-part of application No. 10/458,547, filed on Jun. 9, 2003.

(51) Int. Cl.
*G06F 17/50* (2006.01)

(52) U.S. Cl. .................................. 716/6; 716/10
(58) Field of Classification Search ............... 716/6–14
See application file for complete search history.

(56) References Cited

U.S. PATENT DOCUMENTS

| | | | |
|---|---|---|---|
| 6,018,623 A | 1/2000 | Chang et al. | |
| 6,378,109 B1 | 4/2002 | Young et al. | |
| 6,405,348 B1 * | 6/2002 | Fallah-Tehrani et al. | 716/4 |
| 6,907,586 B1 * | 6/2005 | Al-Dabagh et al. | 716/5 |
| 6,907,590 B1 * | 6/2005 | Al-Dabagh et al. | 716/6 |
| 2004/0103386 A1 * | 5/2004 | Becer et al. | 716/13 |

* cited by examiner

*Primary Examiner*—Jack Chiang
*Assistant Examiner*—Binh Tat
(74) *Attorney, Agent, or Firm*—Eric J. Whitesell

(57) ABSTRACT

A method and computer program product for finding timing critical nets in an integrated circuit design includes steps of: (a) receiving an integrated circuit design as input; (b) calculating an approximate delay for each net in the integrated circuit design wherein the approximate delay includes an estimate of crosstalk delay; (c) identifying timing critical nets from the calculated delay for each net in the integrated circuit design; (d) calculating a corresponding exact delay for each of the timing critical nets; (e) replacing the approximate delay calculated for each of the timing critical nets with the corresponding exact delay to generate a corrected set of net delays for the integrated circuit design; and (f) generating as output the corrected set of net delays for the integrated circuit design.

22 Claims, 9 Drawing Sheets

600 →
| Crosstalk Risk for Nets | | | | | | | | | | | |
|---|---|---|---|---|---|---|---|---|---|---|---|
| X | Y= | | | | | | | | | | Risk_th |
| | 0.2 | 0.4 | 0.6 | 0.8 | 1 | 1.2 | 1.4 | 1.6 | 1.8 | 2 | |
| 0.1 | 0.14 | 0.18 | 0.20 | 0.22 | 0.23 | 0.25 | 0.26 | 0.27 | 0.28 | 0.29 | 0.3169 |
| 0.2 | 0.17 | 0.20 | 0.23 | 0.25 | 0.27 | 0.28 | 0.30 | 0.31 | 0.32 | 0.33 | 0.3169 |
| 0.3 | 0.18 | 0.22 | 0.25 | 0.27 | 0.29 | 0.31 | 0.32 | 0.34 | 0.35 | 0.36 | 0.3169 |
| 0.4 | 0.19 | 0.23 | 0.26 | 0.29 | 0.31 | 0.33 | 0.34 | 0.35 | 0.37 | 0.38 | 0.3169 |
| 0.5 | 0.20 | 0.24 | 0.28 | 0.30 | 0.32 | 0.34 | 0.36 | 0.37 | 0.38 | 0.40 | 0.3169 |
| 0.6 | 0.21 | 0.25 | 0.29 | 0.31 | 0.33 | 0.35 | 0.37 | 0.38 | 0.40 | 0.41 | 0.3169 |
| 0.7 | 0.21 | 0.26 | 0.30 | 0.32 | 0.34 | 0.36 | 0.38 | 0.40 | 0.41 | 0.42 | 0.3169 |
| 0.8 | 0.22 | 0.27 | 0.30 | 0.33 | 0.35 | 0.37 | 0.39 | 0.41 | 0.42 | 0.44 | 0.3169 |
| 0.9 | 0.22 | 0.28 | 0.31 | 0.34 | 0.36 | 0.38 | 0.40 | 0.42 | 0.43 | 0.45 | 0.3169 |
| 1 | 0.23 | 0.28 | 0.32 | 0.35 | 0.37 | 0.39 | 0.41 | 0.43 | 0.44 | 0.46 | 0.3169 |
FIG._6
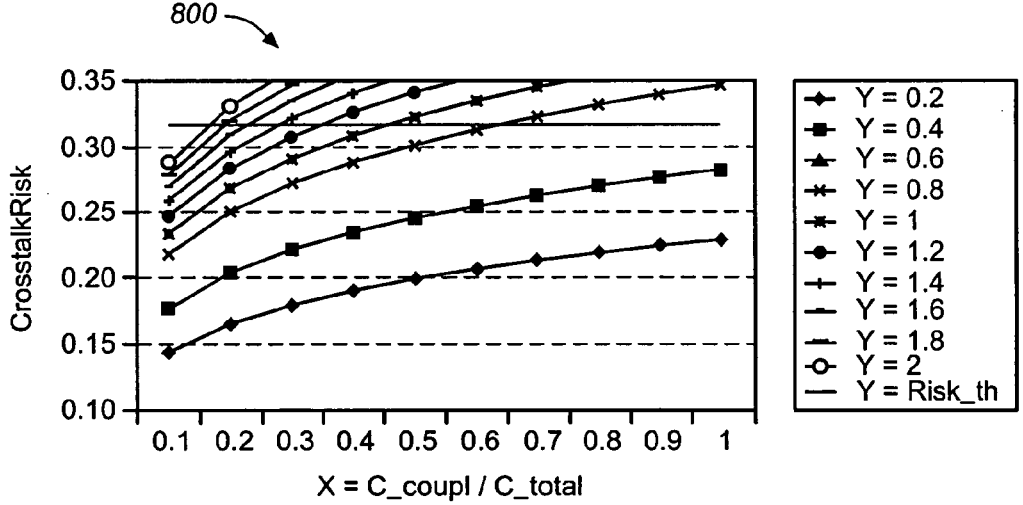
FIG._8

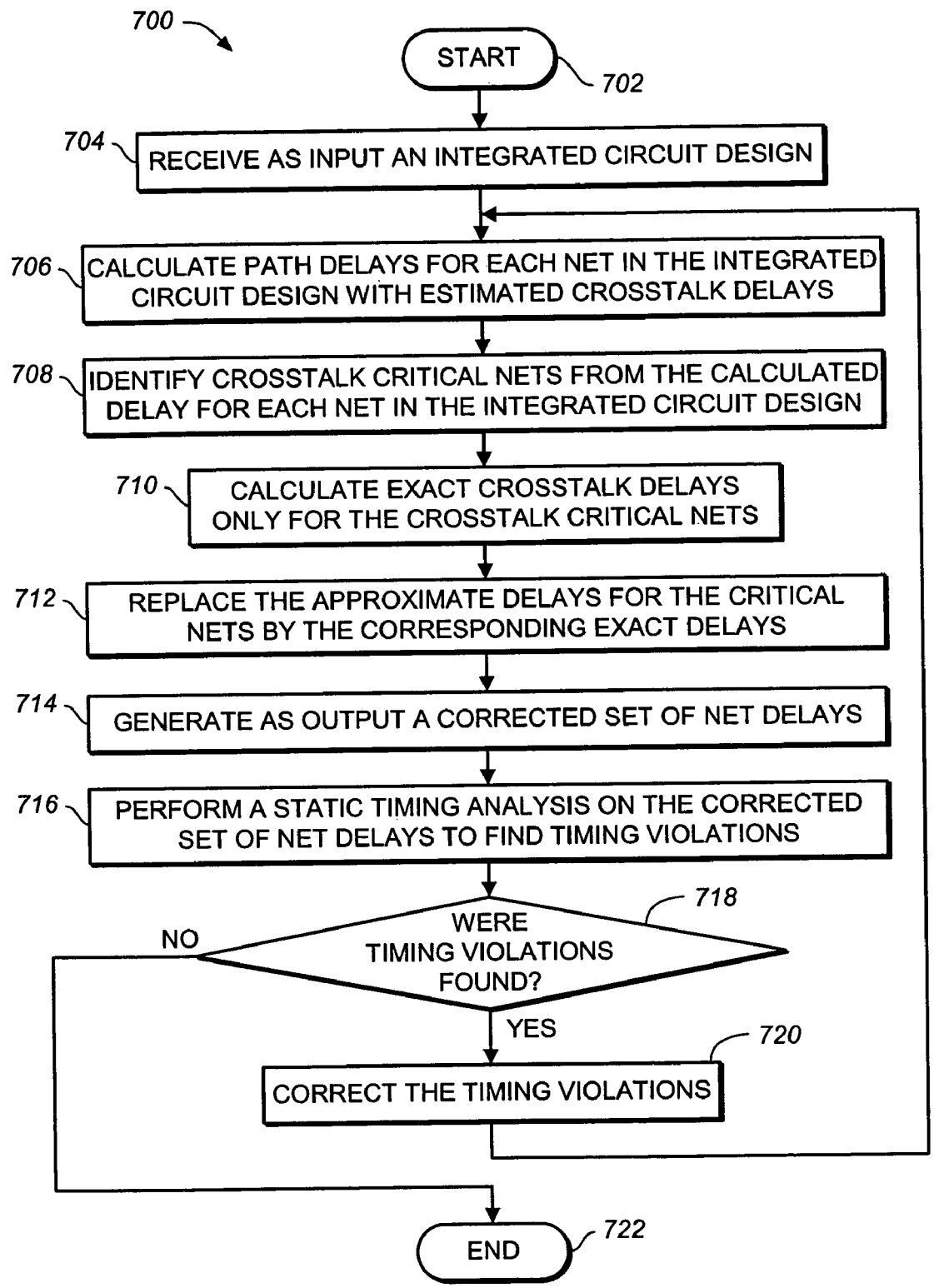
FIG._7

| Crosstalk Risk for Nets | | | | | | | | | | |
|---|---|---|---|---|---|---|---|---|---|---|
| M | Y= 0.2 | 0.4 | 0.6 | 0.8 | 1 | 1.2 | 1.4 | 1.6 | 1.8 | 2 | Risk_th |
| 0.1 | 0.10 | 0.12 | 0.14 | 0.15 | 0.16 | 0.17 | 0.18 | 0.19 | 0.19 | 0.20 | 0.32 |
| 0.2 | 0.14 | 0.17 | 0.20 | 0.21 | 0.23 | 0.24 | 0.25 | 0.26 | 0.27 | 0.28 | 0.32 |
| 0.3 | 0.17 | 0.21 | 0.24 | 0.26 | 0.28 | 0.30 | 0.31 | 0.32 | 0.33 | 0.35 | 0.32 |
| 0.4 | 0.20 | 0.25 | 0.28 | 0.30 | 0.32 | 0.34 | 0.36 | 0.37 | 0.39 | 0.40 | 0.32 |
| 0.5 | 0.22 | 0.28 | 0.31 | 0.34 | 0.36 | 0.38 | 0.40 | 0.42 | 0.43 | 0.45 | 0.32 |
| 0.6 | 0.24 | 0.30 | 0.34 | 0.37 | 0.40 | 0.42 | 0.44 | 0.46 | 0.47 | 0.49 | 0.32 |
| 0.7 | 0.26 | 0.33 | 0.37 | 0.40 | 0.43 | 0.45 | 0.47 | 0.49 | 0.51 | 0.53 | 0.32 |
| 0.8 | 0.28 | 0.35 | 0.39 | 0.43 | 0.46 | 0.48 | 0.51 | 0.53 | 0.55 | 0.56 | 0.32 |
| 0.9 | 0.30 | 0.37 | 0.42 | 0.45 | 0.49 | 0.51 | 0.54 | 0.56 | 0.58 | 0.60 | 0.32 |
| 1 | 0.32 | 0.39 | 0.44 | 0.48 | 0.51 | 0.54 | 0.57 | 0.59 | 0.61 | 0.63 | 0.32 |
FIG._9
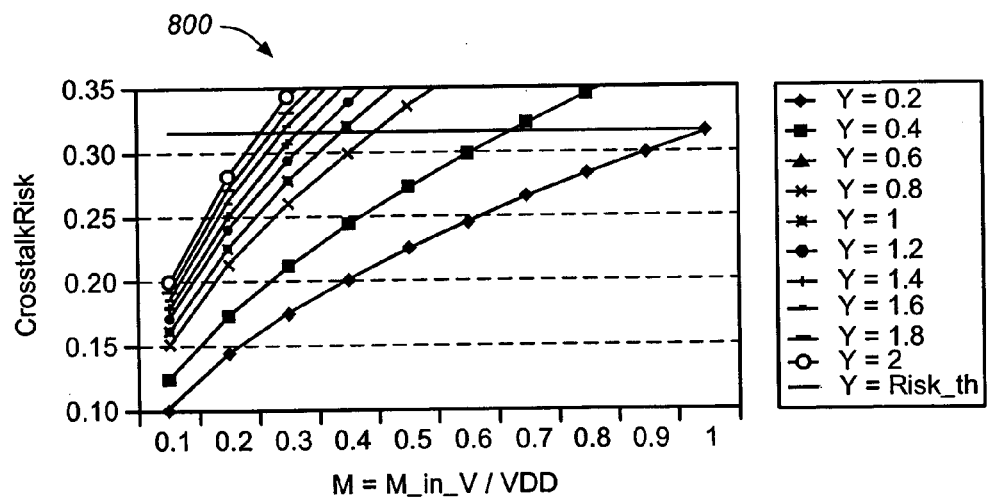
FIG._10

| Crosstalk Risk for Nets | | | | | | | | | | | |
|---|---|---|---|---|---|---|---|---|---|---|---|
| Z | Y= | | | | | | | | | | Risk_th |
| | 0.2 | 0.4 | 0.6 | 0.8 | 1 | 1.2 | 1.4 | 1.6 | 1.8 | 2 | |
| 0.025 | 0.05 | 0.06 | 0.07 | 0.08 | 0.08 | 0.09 | 0.09 | 0.09 | 0.10 | 0.10 | 0.32 |
| 0.05 | 0.07 | 0.09 | 0.10 | 0.11 | 0.11 | 0.12 | 0.13 | 0.13 | 0.14 | 0.14 | 0.32 |
| 0.075 | 0.09 | 0.11 | 0.12 | 0.13 | 0.14 | 0.15 | 0.16 | 0.16 | 0.17 | 0.17 | 0.32 |
| 0.1 | 0.10 | 0.12 | 0.14 | 0.15 | 0.16 | 0.17 | 0.18 | 0.19 | 0.19 | 0.20 | 0.32 |
| 0.125 | 0.11 | 0.14 | 0.16 | 0.17 | 0.18 | 0.19 | 0.20 | 0.21 | 0.22 | 0.22 | 0.32 |
| 0.15 | 0.12 | 0.15 | 0.17 | 0.19 | 0.20 | 0.21 | 0.22 | 0.23 | 0.24 | 0.24 | 0.32 |
| 0.175 | 0.13 | 0.16 | 0.18 | 0.20 | 0.21 | 0.23 | 0.24 | 0.25 | 0.26 | 0.26 | 0.32 |
| 0.2 | 0.14 | 0.17 | 0.20 | 0.21 | 0.23 | 0.24 | 0.25 | 0.26 | 0.27 | 0.28 | 0.32 |
| 0.225 | 0.15 | 0.18 | 0.21 | 0.23 | 0.24 | 0.26 | 0.27 | 0.28 | 0.29 | 0.30 | 0.32 |
| 0.25 | 0.16 | 0.19 | 0.22 | 0.24 | 0.26 | 0.27 | 0.28 | 0.29 | 0.31 | 0.32 | 0.32 |
| 0.275 | 0.17 | 0.20 | 0.23 | 0.25 | 0.27 | 0.28 | 0.30 | 0.31 | 0.32 | 0.33 | 0.32 |
| 0.3 | 0.17 | 0.21 | 0.24 | 0.26 | 0.28 | 0.30 | 0.31 | 0.32 | 0.33 | 0.35 | 0.32 |
| 0.325 | 0.18 | 0.22 | 0.25 | 0.27 | 0.29 | 0.31 | 0.32 | 0.34 | 0.35 | 0.36 | 0.32 |
| 0.35 | 0.19 | 0.23 | 0.26 | 0.28 | 0.30 | 0.32 | 0.34 | 0.35 | 0.36 | 0.37 | 0.32 |
| 0.375 | 0.19 | 0.24 | 0.27 | 0.29 | 0.31 | 0.33 | 0.35 | 0.36 | 0.37 | 0.39 | 0.32 |
| 0.4 | 0.20 | 0.25 | 0.28 | 0.30 | 0.32 | 0.34 | 0.36 | 0.37 | 0.39 | 0.40 | 0.32 |
| 0.425 | 0.21 | 0.25 | 0.29 | 0.31 | 0.33 | 0.35 | 0.37 | 0.38 | 0.40 | 0.41 | 0.32 |
| 0.45 | 0.21 | 0.26 | 0.29 | 0.32 | 0.34 | 0.36 | 0.38 | 0.40 | 0.41 | 0.42 | 0.32 |
| 0.475 | 0.22 | 0.27 | 0.30 | 0.33 | 0.35 | 0.37 | 0.39 | 0.41 | 0.42 | 0.43 | 0.32 |
| 0.5 | 0.22 | 0.28 | 0.31 | 0.34 | 0.36 | 0.38 | 0.40 | 0.42 | 0.43 | 0.45 | 0.32 |
*FIG._11*
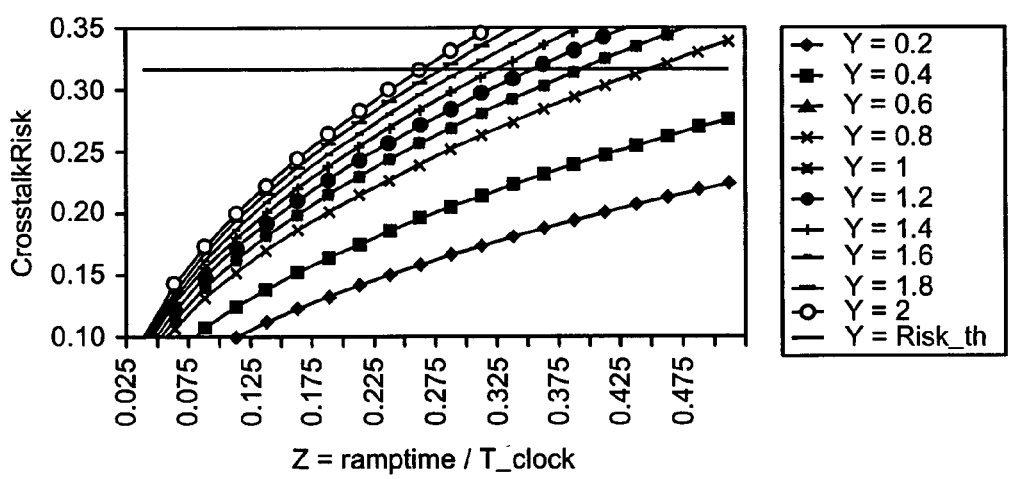
*FIG._12*

METHOD OF FINDING CRITICAL NETS IN AN INTEGRATED CIRCUIT DESIGN

CROSS REFERENCE TO RELATED APPLICATIONS

This application for patent is a continuation in part of pending U.S. patent application Ser. No. 10/458,547, filed Jun. 9, 2003, for INTELLIGENT CROSSTALK DELAY ESTIMATOR FOR INTEGRATED CIRCUIT DESIGN FLOW, incorporated herein by reference. This application for patent is related to U.S. Pat. No. 6,378,109, issued on Apr. 23, 2002, for METHOD OF SIMULATION FOR GATE OXIDE INTEGRITY CHECK ON AN ENTIRE IC, incorporated herein by reference.

BACKGROUND OF THE INVENTION

1. Field of the Invention

The present invention is directed to integrated circuit design software used in the manufacture of integrated circuits. More specifically, but without limitation thereto, the present invention is directed to estimating net delay with crosstalk delay in an integrated circuit design.

2. Description of Related Art

In a previous design flow used in the manufacture of integrated circuits, path delays are calculated using static timing analysis (STA) to find timing critical nets. A timing critical net is a net that belongs to a timing critical path. A path is timing critical, for example, if it has a timing slack that is less than some positive limit, that is, the propagation delay of the path may not meet setup or hold time specifications due to the effect of crosstalk delay. After placement and detailed routing, a crosstalk analysis is performed to determine the effect of crosstalk interference on net delay, referred to as crosstalk delay. A timing closure step is then performed to detect timing violations in the design, and another placement and detailed routing is performed to resolve the timing violations. The crosstalk analysis is typically based on a transistor level simulation and is highly accurate. A disadvantage of this method is that several iterations may be required to resolve all timing violations. The most time consuming step is timing closure after parasitic analysis, that is, including crosstalk analysis.

SUMMARY OF THE INVENTION

In one aspect of the present invention, a method includes steps of:
(a) receiving an integrated circuit design as input;
(b) calculating an approximate delay for each net in the integrated circuit design wherein the approximate delay includes an estimate of crosstalk interference;
(c) identifying timing critical nets from the calculated delay for each net in the integrated circuit design;
(d) calculating a corresponding exact delay for each of the timing critical nets;
(e) replacing the approximate delay calculated for each of the timing critical nets with the corresponding exact delay to generate a corrected set of delays for the integrated circuit design; and
(f) generating as output the corrected set of path delays for the integrated circuit design.

In another aspect of the present invention, a computer program product for estimating crosstalk delay for an integrated circuit design flow includes:
a medium for embodying a computer program for input to a computer; and
a computer program embodied in the medium for causing the computer to perform steps of:
(a) receiving an integrated circuit design as input;
(b) calculating an approximate delay for each net in the integrated circuit design wherein the approximate delay includes an estimate of crosstalk interference;
(c) identifying timing critical nets from the calculated delay for each net in the integrated circuit design;
(d) calculating a corresponding exact delay for each of the timing critical nets;
(e) replacing the approximate delay calculated for each of the timing critical nets with the corresponding exact delay to generate a corrected set of delays for the integrated circuit design; and
(f) generating as output the corrected set of path delays for the integrated circuit design.

In yet another aspect of the present invention, a method includes steps of:
(a) receiving an integrated circuit design as input;
(b) calculating an approximate delay for each net in the integrated circuit design wherein the approximate delay includes an estimate of crosstalk interference;
(c) identifying crosstalk critical nets from the calculated delay for each net in the integrated circuit design;
(d) calculating a corresponding exact delay only for each of the crosstalk critical nets;
(e) replacing the approximate delay calculated for each of the crosstalk critical nets with the corresponding exact delay to generate a corrected set of delays for the integrated circuit design; and
(f) generating as output the corrected set of path delays for the integrated circuit design.

In still another aspect of the present invention, a computer program product for estimating crosstalk delay for an integrated circuit design flow includes:
a medium for embodying a computer program for input to a computer; and
a computer program embodied in the medium for causing the computer to perform steps of:
(a) receiving an integrated circuit design as input;
(b) calculating an approximate delay for each net in the integrated circuit design wherein the approximate delay includes an estimate of crosstalk interference;
(c) identifying crosstalk critical nets from the calculated delay for each net in the integrated circuit design;
(d) calculating a corresponding exact delay only for each of the crosstalk critical nets;
(e) replacing the approximate delay calculated for each of the crosstalk critical nets with the corresponding exact delay to generate a corrected set of delays for the integrated circuit design; and
(f) generating as output the corrected set of path delays for the integrated circuit design.

DESCRIPTION OF THE ILLUSTRATED EMBODIMENTS

The present invention is illustrated by way of example and not limitation in the accompanying figures, in which like references indicate similar elements throughout the several views of the drawings, and in which:

FIG. 6 illustrates a table of crosstalk critical nets identified from two crosstalk risk factors X and Y according to the method of FIG. 5;

FIG. 7 illustrates a flow chart of a method and computer program product for finding crosstalk critical nets according to an embodiment of the present invention;

FIG. 8 illustrates a plot of crosstalk risk calculated for crosstalk risk factors X and Y according to the method of FIG. 5;

FIG. 9 illustrates a table of crosstalk critical nets identified from two crosstalk risk factors M and Y according to the method of FIG. 5;

FIG. 10 illustrates a plot of crosstalk risk calculated for crosstalk risk factors M and Y according to the method of FIG. 5;

FIG. 11 illustrates a table of crosstalk critical nets identified from two crosstalk risk factors Y and Z according to the method of FIG. 5; and FIG. 12 illustrates a plot of crosstalk risk calculated for crosstalk risk factors Y and Z according to the method of FIG. 5.

Figure 1:
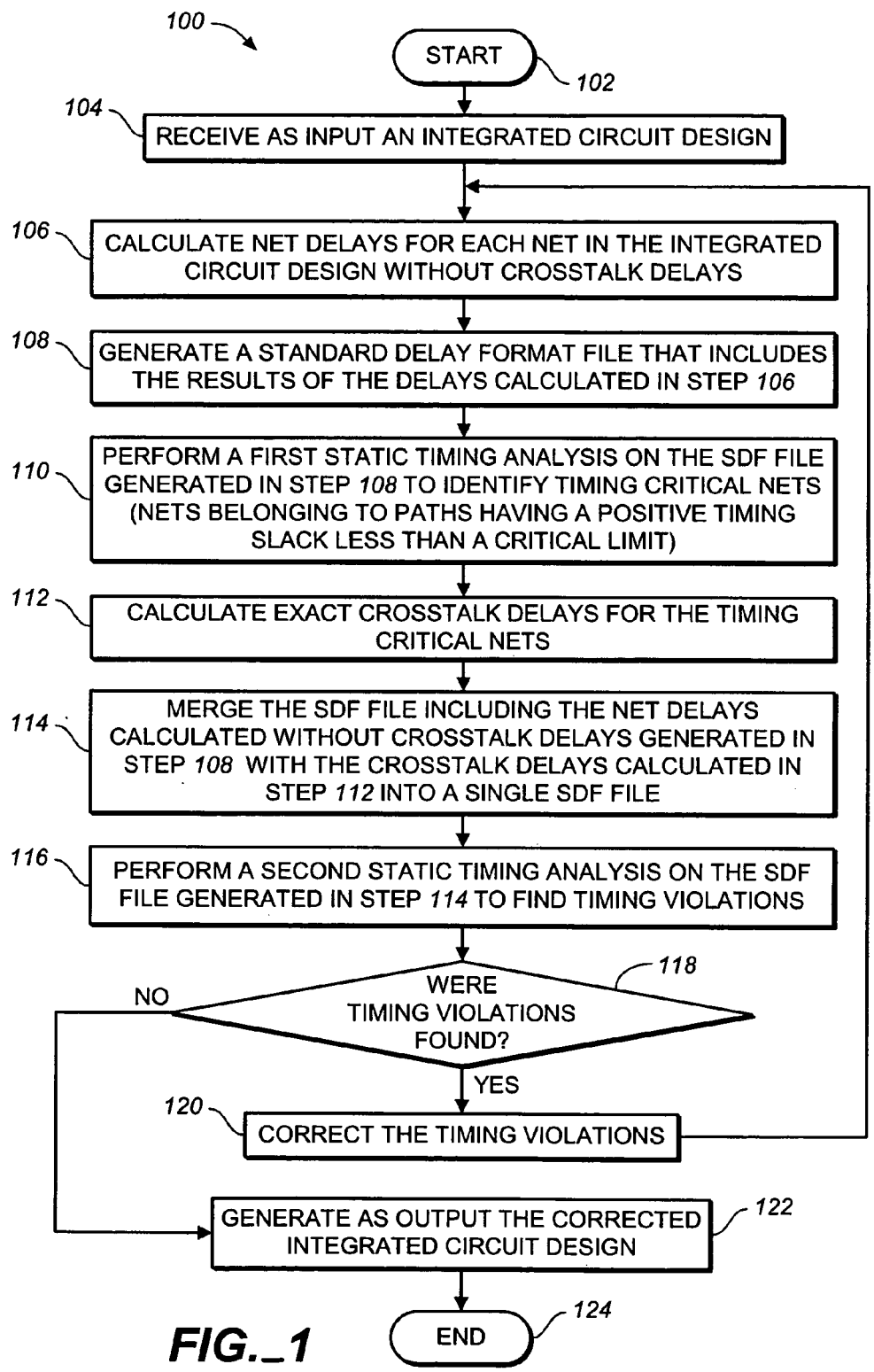
FIG. 1 illustrates a flow chart for a method of closing timing for an integrated circuit design according to the prior art.

Elements in the figures are illustrated for simplicity and clarity and have not necessarily been drawn to scale. For example, the dimensions of some elements in the figures may be exaggerated relative to other elements to point out distinctive features in the illustrated embodiments of the present invention.

DESCRIPTION OF THE ILLUSTRATED EMBODIMENTS

One of the most significant factors that may affect propagation delay in a net of an integrated circuit design is the crosstalk noise generated from signals carried in wires adjacent to the net. The crosstalk noise may inject an incremental crosstalk delay (positive or negative) in a net. Crosstalk noise is generally capacitively coupled between traces in an integrated circuit and is most significant when the sources of the crosstalk, commonly referred to as aggressor nets, or "aggressors", have a fast switching waveform. The switching waveforms of one or more aggressor nets are coupled by parasitic coupling capacitances to a net that is in a non-switching state when the crosstalk is generated, commonly referred to as a victim net or "victim". Crosstalk noise may cause false switching in the victim net and consequent failure of the integrated circuit design to meet performance specifications.

Previous methods for calculating crosstalk delay in integrated circuit designs analyze nets that belong to a timing critical path. A path is timing critical to the setup time requirement if the propagation delay of the path is more than an empirical threshold, typically about 90 percent, of the clock period. Equivalently, the path has a timing slack of less than 10 percent of the clock period. A path is usually timing critical to setup time if the path includes a large number of cells, typically 40 to 70, and if the average wire length between cells is more than a small value, for example, 200 microns. A path may also be timing critical to setup time if the path includes an average number of cells, typically 25 to 30, and if the average wire length between cells is more than a large value, for example, 500 microns. A path is timing critical to hold time if the propagation delay of the path is less than an empirical threshold, typically about 10 percent, of the clock period. A path is usually timing critical to hold time if the path includes a small number of cells, typically 0 to 5, and the average wire length between cells is less than a small value, for example, 200 microns. A timing critical net is a net that belongs to a timing critical path.

In previous design flows, a delay calculation is performed on a netlist without including crosstalk induced delay, then a static timing analysis is performed to identify nets that may be timing critical nets due to crosstalk induced delay. Another delay calculation is performed on the timing critical nets, and another timing analysis is performed to determine whether the crosstalk induced delay results in any timing violations. If timing violations are found, the integrated circuit layout is modified, and another crosstalk analysis is performed. This cycle is iterated until all timing violations are removed. Because two static timing analyses are performed in each iteration, timing closure may be an extremely time-consuming and costly process.

FIG. 1 illustrates a flow chart 100 for a method of closing timing for an integrated circuit design according to the prior art.

Step 102 is the entry point of the flow chart 100.

In step 104, an integrated circuit design is received as input, for example, as a netlist.

In step 106, net delays are calculated for each net in the integrated circuit design without crosstalk delays.

In step 108, a standard delay format (SDF) file is generated that includes the results of the delays calculated in step 106.

In step 110, a first static timing analysis is performed on the SDF file generated in step 108 to identify timing critical nets. Because the effects of crosstalk induced delay were not included in the delay calculation of step 104, a timing critical path is generally defined in this method as a path having a timing slack that is less than some empirically selected critical delay, for example, 600 picoseconds. The critical delay varies with the integrated circuit technology, and is typically received as input from a technology library containing information specific to each integrated circuit technology.

In step 112, exact crosstalk delays are calculated for the timing critical nets identified in step 110 using a simulation tool, for example, HSPICE.

In step 114, the SDF file including the net delays calculated without crosstalk delays generated in step 108 is merged with the crosstalk delays calculated in step 112 into a single SDF file.

In step 116, a second static timing analysis is performed on the SDF file generated in step 114 to find timing violations, that is, paths having negative slack.

In step 118, if timing is not closed, that is, if timing violations are found, then the procedure continues from step 120. Otherwise, the procedure continues from step 122.

In step 120, the timing violations are corrected by making modifications to the integrated circuit design, and the procedure continues from 106 until all the timing violations are corrected.

In step 122, the corrected integrated circuit design is generated as output.

Step 124 is the exit point of the flow chart 100.

Some disadvantages of the method of FIG. 1 are:
(1) the two static timing analysis steps are run time intensive, and they complicate the design flow;
(2) the exact value of the critical delay is not known for each design; the greater the value selected, the less chance of failing to find a timing critical path with crosstalk induced delay, however, the number of time critical paths requiring delay calculations is also increased, resulting in a corresponding increase in run time; and
(3) because of the large amount of run time required for the simulation in step 110, crosstalk induced delays are not calculated for timing non-critical nets; consequently, there is a risk that some timing violations may not be found.

The method of FIG. 1 may be improved by replacing the critical delay value by an initial delay calculation that includes estimated crosstalk induced delay, for example, by applying a capacitive margin to the net capacitance to approximate the effect of crosstalk induced delay.

In one aspect of the present invention, a method includes steps of:
(a) receiving an integrated circuit design as input;
(b) calculating an approximate delay for each net in the integrated circuit design wherein the approximate delay includes an estimate of crosstalk interference;
(c) identifying timing critical nets from the calculated delay for each net in the integrated circuit design;
(d) calculating a corresponding exact delay for each of the timing critical nets;
(e) replacing the approximate delay calculated for each of the timing critical nets with the corresponding exact delay to generate a corrected set of delays for the integrated circuit design; and
(f) generating as output the corrected set of path delays for the integrated circuit design.

Figure 2:
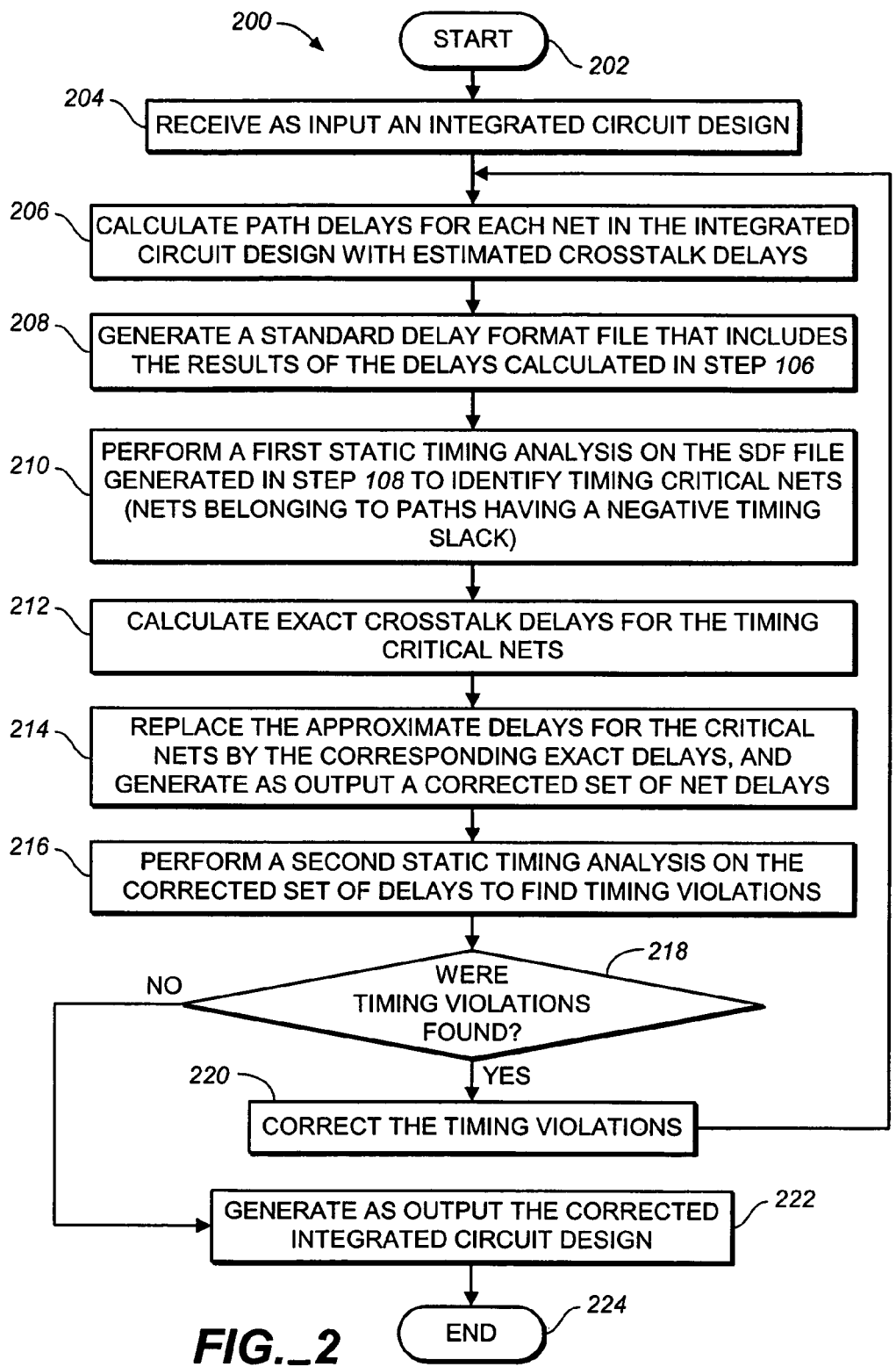
FIG. 2 illustrates a flow chart for a method of finding timing critical nets in an integrated circuit design including crosstalk estimation according to an embodiment of the present invention.

FIG. 2 illustrates a flow chart 200 for a method of finding timing critical nets in an integrated circuit design including crosstalk estimation according to an embodiment of the present invention.

Step 202 is the entry point of the flow chart 200.

In step 204, an integrated circuit design is received as input, for example, as a netlist.

In step 206, net delays are calculated as in the method of FIG. 1, except that an estimate of crosstalk delay is also included in the net delay calculation, for example, by multiplying the net coupling capacitance of each net by a margin factor to approximate the effects of crosstalk induced delay. Because the estimated crosstalk delay is included in the calculated net delay, the resulting net delays are approximate.

In step 208, a standard delay format (SDF) file is generated that includes the results of the approximate delays calculated in step 206.

In step 210, a first static timing analysis is performed on the SDF file generated in step 208 to find timing critical nets. Because estimated crosstalk delay is included in the delay calculation of step 204, a timing critical net is identified in this method simply by defining a timing critical net as a net that belongs to a path that has a negative timing slack, not by comparing the calculated delay to an unknown critical delay value as in the method of FIG. 1.

In step 212, exact delays are calculated only for the nets identified as timing critical nets using a circuit simulation tool, for example, HSPICE. The term "exact delays" means that the calculated delays are based on a circuit simulation that models the crosstalk delays rather than on estimated crosstalk delays as in step 206. The added time and corresponding cost of the circuit simulation is mitigated by only simulating nets identified as timing critical nets.

In step 214, the approximate delays for the timing critical nets are replaced by the corresponding exact delays, and a corrected set of delays is generated as output, for example, as a standard delay format file.

In step 216, a second static timing analysis is performed on the corrected set of delays to find timing violations, that is, paths having negative slack.

In step 218, if timing is not closed, that is, if timing violations are found, then the procedure continues from step 220. Otherwise, the procedure continues from step 222.

In step 220, the timing violations are corrected by making modifications to the integrated circuit design, and the procedure continues from 206 until all the timing violations are corrected.

In step 222, the corrected integrated circuit design is generated as output.

Step 224 is the exit point of the flow chart 200.

The method of FIG. 2 avoids the disadvantages of the method of FIG. 1 described above, and ensures that all timing violations are found.

A further improvement to the method of FIG. 1 may be made that avoids the time and cost of the first static timing analysis and provides a more accurate delay calculation needed in complex designs in which a single method of delay calculation is inadequate.

Figure 3:
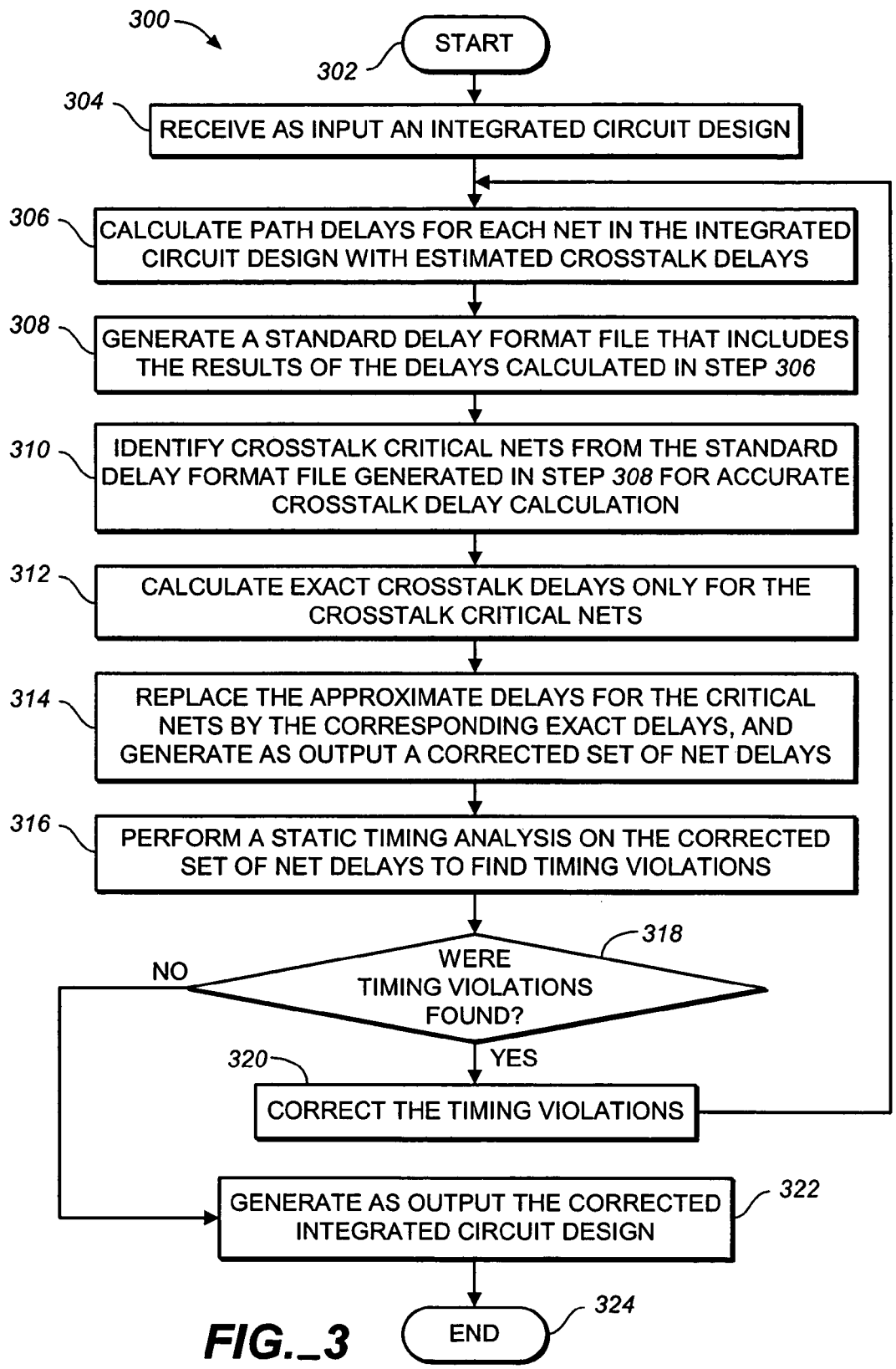
FIG. 3 illustrates a flow chart for a method of finding crosstalk critical nets in an integrated circuit design including filtering crosstalk critical nets according to an embodiment of the present invention.

FIG. 3 illustrates a flow chart 300 for a method of finding crosstalk critical nets in an integrated circuit design including filtering crosstalk critical nets according to an embodiment of the present invention.

Step 302 is the entry point of the flow chart 300.

In step 304, an integrated circuit design is received as input, for example, as a netlist.

In step 306, net delays are calculated as in the method of FIG. 1, except that an estimate of crosstalk delay is also included in the net delay calculation, for example, by multiplying the net coupling capacitance of each net by a margin factor to approximate the effects of crosstalk induced delay.

In step 308, a standard delay format (SDF) file is generated that includes the approximate delays calculated in step 306.

In step 310, crosstalk critical nets are identified from the standard delay format file generated in step 308 for accurate crosstalk delay calculation. The identification of crosstalk critical nets is described in detail below.

In step 312, exact delays are calculated only for the crosstalk critical nets identified in step 310 using a simulation tool, for example, HSPICE. An important feature of this embodiment of the present invention is that no static timing analysis step is required to find timing critical nets as in the methods of FIGS. 1 and 2.

In step 314, the approximate delays for the crosstalk critical nets are replaced by the corresponding exact delays, and a corrected set of delays is generated as output, for example, as a standard delay format file.

In step 316, a static timing analysis is performed on the corrected set of delays to find timing violations, that is, paths having negative timing slack.

In step 318, if timing is not closed, that is, if timing violations are found, then the procedure continues from step 320. Otherwise, the procedure continues from step 322.

In step 320, the timing violations are corrected by making modifications to the integrated circuit design, and the procedure continues from 306 until all the timing violations are corrected.

In step 322, the corrected integrated circuit design is generated as output.

Step 324 is the exit point of the flow chart 300.

Advantages of the method of the present invention illustrated by the flow chart 300 include performing the exact delay calculations requiring the simulation tool only for crosstalk critical nets rather than for all timing critical nets, and performing only one static timing analysis step in each timing closure iteration. As a result, the turnaround time and corresponding costs for completing the integrated circuit design may be significantly reduced.

Two methods that may be used to identify, or filter, crosstalk critical nets in step 310 of the flow chart 300 are described as follows.

In the first method, a crosstalk critical net is defined as a net that has a ratio of net length to critical length that exceeds a selected critical length ratio, a ratio of coupling capacitance to total net capacitance that exceeds a selected critical coupling capacitance ratio, a ratio of glitch peak to supply voltage that exceeds a selected glitch peak ratio, and a ratio of ramptime to clock period that exceeds a selected critical ramptime ratio.

The critical length is a function of the strength of the cell driving the net. The coupling capacitance is the total coupling capacitance between the victim net and all its aggressors. A glitch is a noise spike that is induced in a victim net by an aggressor net, and the glitch peak is usually available at this point in the design flow. The ramptime is the time required for the cell driving the net to transition from a low logic level to a high logic level.

Figure 4:
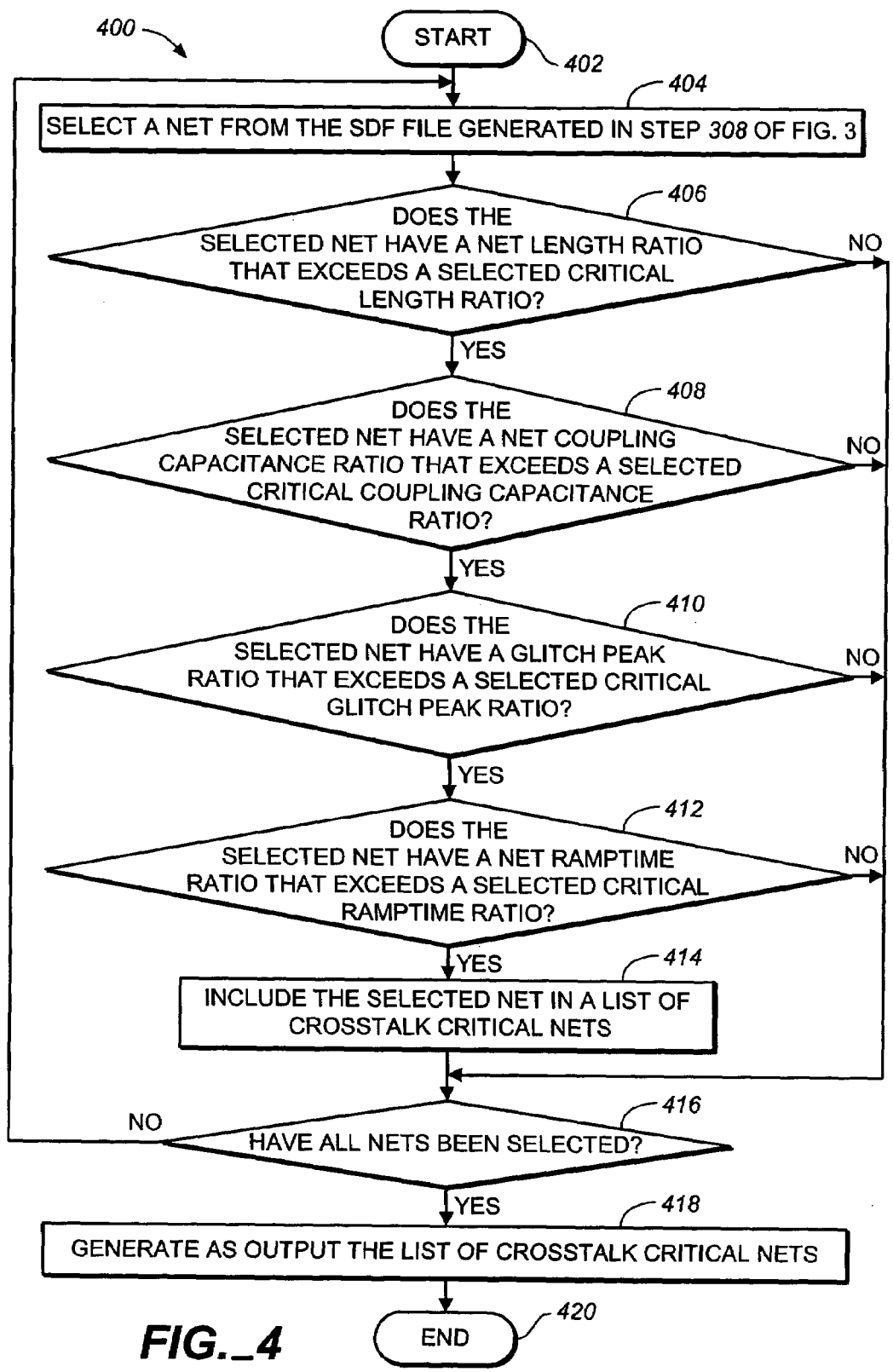
FIG. 4 illustrates a flow chart for a method of filtering crosstalk critical nets as a function of multiple crosstalk risk factors according to an embodiment of the present invention.

FIG. 4 illustrates a flow chart 400 for a method of filtering crosstalk critical nets as a function of multiple crosstalk risk factors according to an embodiment of the present invention.

Step 402 is the entry point of the flow chart 400.

In step 404, a net from the SDF file generated in step 308 of the flow chart 300 in FIG. 3 is selected.

In step 406, if the selected net has a ratio of net length to critical length, or net length ratio, that exceeds a selected critical length ratio, for example, 2.5, then the next step continues at step 408. Otherwise, the next step continues at step 416.

In step 408, if the selected net has a ratio of coupling capacitance to critical coupling capacitance, or net coupling capacitance ratio, that exceeds a selected critical coupling capacitance ratio, for example, 0.35, then the next step continues at step 410. Otherwise, the next step continues at step 416.

In step 410, if the selected net has a ratio of glitch peak to supply voltage, or net glitch peak ratio, that exceeds a selected critical glitch peak ratio, for example, 0.35, then the next step continues at step 412. Otherwise, the next step continues at step 416.

In step 412, if the selected net has a ratio of ramptime to clock period that exceeds a selected critical ramptime ratio, for example, 40 percent of the clock period, then the next step continues at step 414. Otherwise, the next step continues at step 416.

In step 414, the selected net is included in a list of crosstalk critical nets.

In step 416, if all nets in the SDF file have been selected, then the next step continues from step 418. Otherwise, the next step continues from step 404.

In step 418, the list of crosstalk critical nets is generated as output.

Step 420 is the exit point of the flow chart 400.

Besides the example illustrated in FIG. 4, the selected net may be compared to other crosstalk risk factors appropriate to various chip technologies, and different combinations of crosstalk risk factors may be used to practice various embodiments of the present invention according to the scope of the appended claims. For example, the selected net may be compared to any two or more of the crosstalk risk factors described above to determine whether the selected net is a crosstalk critical net.

Figure 5:
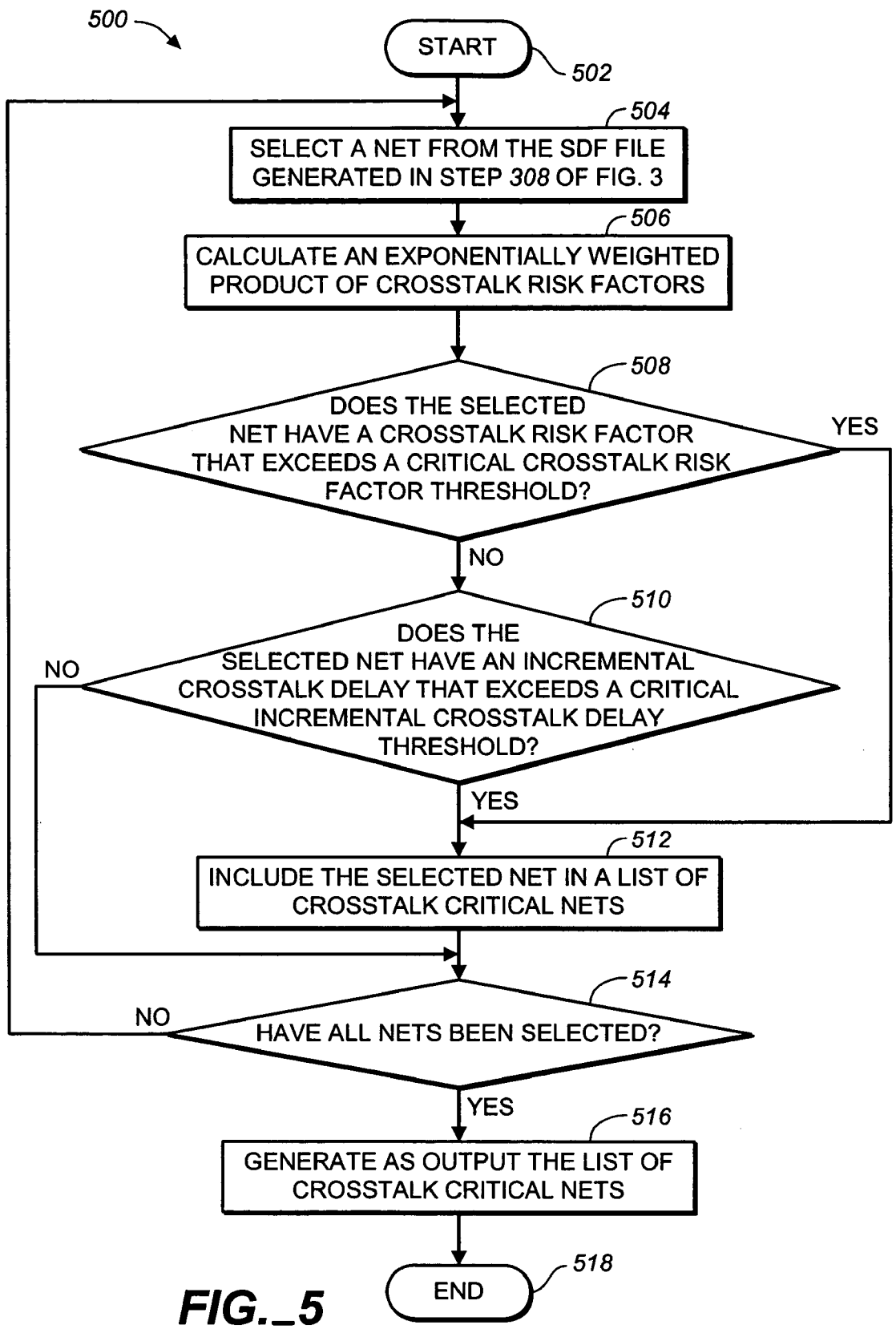
FIG. 5 illustrates a flow chart for a method of filtering crosstalk critical nets as a function of a single crosstalk risk factor according to an embodiment of the present invention.

FIG. 5 illustrates a flow chart 500 for a method of filtering crosstalk critical nets as a function of an exponentially weighted product of crosstalk risk factors according to an embodiment of the present invention.

Step 502 is the entry point of the flow chart 500.

In step 504, a net from the SDF file generated in step 308 of the flow chart 300 in FIG. 3 is selected.

In step 506, an exponentially weighted product of crosstalk risk factors is calculated, for example, according to the following formula:

$$CrosstalkRisk = \frac{\left(\frac{Y}{Yth}\right)^{P1}\left(\frac{X}{Xth}\right)^{P2}\left(\frac{M}{Mth}\right)^{P3}\left(\frac{Z}{Zth}\right)^{P4}}{MaxConst} \quad (1)$$

where $$MaxConst = \left(\frac{Y_{max}}{Yth}\right)^{P1}\left(\frac{X_{max}}{Xth}\right)^{P2}\left(\frac{M_{max}}{Mth}\right)^{P3}\left(\frac{Z_{max}}{Zth}\right)^{P4} \quad (2)$$

An exemplary set of values for the risk factors of net length ratio Y, net coupling capacitance ratio X, net glitch magnitude peak ratio M, and net ramptime ratio Z is illustrated in Table 1 below.

TABLE 1

| Risk factor | (Threshold) | Exponent | Weight | Risk factor | (Maximum) |
|---|---|---|---|---|---|
| Yth | 1.5 | P1 | 0.3 | Ymax | 5 |
| Xth | 0.25 | P2 | 0.2 | Xmax | 1 |
| Mth | 0.3 | P3 | 0.5 | Mmax | 1 |
| Zth | 0.3 | P4 | 0.5 | Zmax | 0.25 |

In step 508, if the selected net has a crosstalk risk factor that exceeds a critical crosstalk risk factor threshold, then the selected net is identified as a crosstalk critical net. If the selected net is identified as a crosstalk critical net, the next step continues at step 512. Otherwise, the next step continues from step 510.

In step 510, an optional step may be included of further identifying the selected net as a crosstalk critical net as a function of incremental crosstalk delay. For example, the selected net may be identified as a crosstalk critical net if the selected net has an incremental crosstalk delay that exceeds a critical incremental crosstalk delay threshold, for example, 100 picoseconds. If the selected net is identified as a crosstalk critical net, the next step continues from step 512. Otherwise, the next step continues from step 514.

In step 512, the selected net is included in a list of crosstalk critical nets.

In step 514, if all nets in the SDF file have been selected, then the next step continues from step 516. Otherwise, the next step continues from step 504.

In step 516, the list of crosstalk critical nets is generated as output.

Step 518 is the exit point of the flow chart 500.

Besides the example illustrated in FIG. 5, the exponentially weighted product of crosstalk risk factors may be selected to suit various chip technologies, and different combinations of crosstalk risk factors may be used to calculate the exponentially weighted product to practice various embodiments of the present invention according to the scope of the appended claims. For example, the selected net may be compared to an exponentially weighted product of two or more of the crosstalk risk factors described above to determine whether the selected net is a crosstalk critical net.

FIG. 6 illustrates a table 600 of crosstalk critical nets identified from two crosstalk risk factors X and Y according to the method of FIG. 5. In the example of FIG. 6, the two crosstalk risk factors X (net coupling capacitance ratio) and Y (net length ratio) vary over a range of values having a different combination for each net, while two crosstalk risk factors M (net glitch peak ratio) and Z (net ramptime ratio) are held constant at their threshold values. The exponentially weighted product calculated from formula (1) for each combination of crosstalk risk factors X and Y associated with the corresponding net is compared to a critical crosstalk risk factor threshold of 0.3169. The identified crosstalk critical nets having a crosstalk risk factor that exceeds the critical crosstalk risk factor threshold are indicated in bold type.

FIG. 7 illustrates a flow chart 700 of a method and computer program product for finding crosstalk critical nets according to an embodiment of the present invention.

Step 702 is the entry point of the flow chart 700.

In step 704, an integrated circuit design is received as input.

In step 706, an approximate delay for each net in the integrated circuit design is calculated that includes an estimate of crosstalk interference.

In step 708, crosstalk critical nets are identified from the calculated delay for each net in the integrated circuit design. For example, a static timing analysis may be performed on the approximate delays to find paths having negative timing slack.

Alternatively, crosstalk critical nets may be identified as a function of multiple crosstalk risk factors, for example, at least two of:
 a ratio of net length to critical length that exceeds a selected critical length ratio,
 a ratio of coupling capacitance to critical coupling capacitance that exceeds a selected critical coupling capacitance ratio,
 a ratio of glitch peak to supply voltage that exceeds a selected critical glitch peak ratio, and
 a ratio of ramptime to clock period that exceeds a selected critical ramptime ratio.

Alternatively, crosstalk critical nets may be identified as a function of a single crosstalk risk factor, for example, an exponentially weighted product of:
 a ratio of net length to critical length,
 a ratio of coupling capacitance to critical coupling capacitance,
 a ratio of glitch peak to supply voltage, and
 a ratio of ramptime to clock period.

Also, crosstalk critical nets may be identified as a function of a single crosstalk risk factor and incremental crosstalk delay.

In step 710, a corresponding exact delay is calculated for each of the crosstalk critical nets.

In step 712, the approximate delay calculated for each of the crosstalk critical nets is replaced with the corresponding exact delay to generate a corrected set of delays for the integrated circuit design.

In step 714, the corrected set of net delays for the integrated circuit design is generated as output.

In step 716, a static timing analysis is performed from the corrected set of net delays to find timing violations.

In step 718, the timing violations are corrected.

In step 720, the next step continues from step 706 until the timing violations are corrected.

Step 722 is the exit point of the flow chart 700.

Although the method of the present invention illustrated by the flowchart descriptions above is described and shown with reference to specific steps performed in a specific order, these steps may be combined, sub-divided, or reordered without departing from the scope of the claims. Unless specifically indicated herein, the order and grouping of steps is not a limitation of the present invention.

FIG. 8 illustrates a plot 800 of crosstalk risk calculated for crosstalk risk factors X and Y according to the method of FIG. 5. In FIG. 8, the crosstalk risk calculated according to formula (1) includes a range of values for the crosstalk risk factors X (net coupling capacitance ratio) and Y (net length ratio), while the values for the crosstalk risk factors M (net glitch peak ratio) and Z (net ramptime ratio) are held constant at their respective threshold values.

FIG. 9 illustrates a table 900 of crosstalk critical nets identified from two crosstalk risk factors M and Y according to the method of FIG. 5. In the example of FIG. 9, the two crosstalk risk factors M (net glitch peak ratio) and Y (net length ratio) vary over a range of values in a different combination for each net, while the two crosstalk risk factors X (net coupling capacitance ratio) and Z (net ramptime ratio) are held constant at their threshold values. The exponentially weighted product calculated from formula (1) for each combination of values for crosstalk risk factors M and Y associated with a corresponding net is compared to a critical crosstalk risk factor threshold of 0.32. The identified crosstalk critical nets having a crosstalk risk factor that exceeds the critical crosstalk risk factor threshold are indicated in bold type.

FIG. 10 illustrates a plot 1000 of crosstalk risk calculated for crosstalk risk factors M and Y according to the method of FIG. 5. In FIG. 10, the crosstalk risk calculated according to formula (1) includes a range of values for the crosstalk risk factors M (net glitch peak ratio) and Y (net length ratio), while the values for the crosstalk risk factors X (net coupling capacitance ratio) and Z (net ramptime ratio) are held constant at their respective threshold values.

FIG. 11 illustrates a table 1100 of crosstalk critical nets identified from two crosstalk risk factors Y and Z according to the method of FIG. 5. In the example of FIG. 11, the two crosstalk risk factors Y (net length ratio) and Z (net ramptime ratio) vary over a range of values in a different combination for each net, while two crosstalk risk factors M (net glitch peak ratio) and X (net coupling capacitance ratio) are held constant at their threshold values. The exponentially weighted product calculated from formula (1) for each combination of crosstalk risk factors Y and Z associated with the corresponding net is compared to a critical crosstalk risk factor threshold of 0.32. The identified crosstalk critical nets having a crosstalk risk factor that exceeds the critical crosstalk risk factor threshold are indicated in bold type.

FIG. 12 illustrates a plot 1200 of crosstalk risk calculated for crosstalk risk factors Y and Z according to the method of FIG. 5. In FIG. 12, the crosstalk risk calculated according to formula (1) includes a range of values for the crosstalk risk factors Y (net length ratio) and Z (net ramptime ratio), while the values for the crosstalk risk factors X (net coupling capacitance ratio) and M (net glitch peak ratio) are held constant at their respective threshold values.

In another aspect of the present invention, a computer program product for estimating crosstalk delay for an integrated circuit design flow includes:

a medium for embodying a computer program for input to a computer; and a computer program embodied in the medium for causing the computer to perform steps of:

(a) receiving an integrated circuit design as input;

(b) calculating an approximate delay for each net in the integrated circuit design wherein the approximate delay includes an estimate of crosstalk interference;

(c) identifying crosstalk critical nets from the calculated delay for each net in the integrated circuit design;

(d) calculating a corresponding exact delay only for each of the crosstalk critical nets;

(e) replacing the approximate delay calculated for each of the crosstalk critical nets with the corresponding exact delay to generate a corrected set of net delays for the integrated circuit design; and (f) generating as output the corrected set of net delays for the integrated circuit design.

While the invention herein disclosed has been described by means of specific embodiments and applications thereof, numerous modifications and variations could be made thereto by those skilled in the art without departing from the scope of the invention set forth in the following claims.

What is claimed is:

1. A method comprising steps of:
(a) receiving an integrated circuit design as input;
(b) calculating an approximate delay for each net in the integrated circuit design wherein the approximate delay includes an estimate of crosstalk delay;
(c) identifying timing critical nets from the calculated delay for each net in the integrated circuit design;
(d) calculating a corresponding exact delay for each of the timing critical nets;
(e) replacing the approximate delay calculated for each of the timing critical nets with the corresponding exact delay to generate a corrected set of net delays for the integrated circuit design; and
(f) generating as output the corrected set of net delays for the integrated circuit design.

2. The method of claim 1 wherein step (c) comprises defining a timing critical net as a net belonging to a path that has negative timing slack.

3. The method of claim 1 further comprising a step of (g) performing a static timing analysis from the corrected set of net delays to find timing violations.

4. The method of claim 3 further comprising a step of (h) correcting the timing violations.

5. The method of claim 4 further comprising a step of (i) continuing from step (b) until the timing violations are corrected.

6. A method comprising steps of:
(a) receiving an integrated circuit design as input;
(b) calculating an approximate delay for each net in the integrated circuit design wherein the approximate delay includes an estimate of crosstalk delay;
(c) identifying crosstalk critical nets from the calculated delay for each net in the integrated circuit design;
(d) calculating a corresponding exact delay for each of the crosstalk critical nets;
(e) replacing the approximate delay calculated for each of the crosstalk critical nets with the corresponding exact delay to generate a corrected set of net delays for the integrated circuit design; and
(f) generating as output the corrected set of net delays for the integrated circuit design.

7. The method of claim 6 wherein step (c) comprises identifying crosstalk critical nets as a function of multiple crosstalk risk factors.

8. The method of claim 7 wherein the function of multiple crosstalk risk factors comprises at least two of:
a ratio of net length to critical length that exceeds a selected critical length ratio,
a ratio of coupling capacitance to critical coupling capacitance that exceeds a selected critical coupling capacitance ratio,
a ratio of glitch peak to supply voltage that exceeds a selected critical glitch peak ratio, and
a ratio of ramptime to clock period that exceeds a selected critical ramptime ratio.

9. The method of claim 6 wherein step (c) comprises identifying crosstalk critical nets as a function of a single crosstalk risk factor.

10. The method of claim 9 wherein step (c) comprises identifying crosstalk critical nets as a function of incremental crosstalk delay.

11. The method of claim 9 wherein the function of a single crosstalk risk factor comprises an exponentially weighted product of at least two of:
a ratio of net length to critical length,
a ratio of coupling capacitance to critical coupling capacitance,
a ratio of glitch peak to supply voltage, and
a ratio of ramptime to clock period.

12. A computer program product for finding timing critical nets in an integrated circuit design comprising:
a medium for embodying a computer program for input to a computer; and
a computer program embodied in the medium for causing the computer to perform steps of:
(a) receiving an integrated circuit design as input;
(b) calculating an approximate delay for each net in the integrated circuit design wherein the approximate delay includes an estimate of crosstalk delay;
(c) identifying timing critical nets from the calculated delay for each net in the integrated circuit design;
(d) calculating a corresponding exact delay for each of the timing critical nets;
(e) replacing the approximate delay calculated for each of the timing critical nets with the corresponding exact delay to generate a corrected set of net delays for the integrated circuit design; and
(f) generating as output the corrected set of net delays for the integrated circuit design.

13. The computer program product of claim 12 wherein step (c) comprises defining a timing critical net as a net belonging to a path that has negative timing slack.

14. The computer program product of claim 12 further comprising a step of (g) performing a static timing analysis from the corrected set of net delays to find timing violations.

15. The computer program product of claim 14 further comprising a step of (h) correcting the timing violations.

16. The computer program product of claim 15 further comprising a step of (i) continuing from step (b) until the timing violations are corrected.

17. A computer program product for finding crosstalk critical nets in an integrated circuit design comprising:
   a medium for embodying a computer program for input to a computer; and
   a computer program embodied in the medium for causing the computer to perform steps of:
   (a) receiving an integrated circuit design as input;
   (b) calculating an approximate delay for each net in the integrated circuit design wherein the approximate delay includes an estimate of crosstalk delay;
   (c) identifying crosstalk critical nets from the calculated delay for each net in the integrated circuit design;
   (d) calculating a corresponding exact delay for each of the crosstalk critical nets;
   (e) replacing the approximate delay calculated for each of the crosstalk critical nets with the corresponding exact delay to generate a corrected set of net delays for the integrated circuit design; and
   (f) generating as output the corrected set of net delays for the integrated circuit design.

18. The computer program product of claim 17 wherein step (c) comprises identifying crosstalk critical nets as a function of multiple crosstalk risk factors.

19. The computer program product of claim 18 wherein the function of multiple crosstalk risk factors comprises at least two of:
   a ratio of net length to critical length that exceeds a selected critical length ratio,
   a ratio of coupling capacitance to critical coupling capacitance that exceeds a selected critical coupling capacitance ratio,
   a ratio of glitch peak to supply voltage that exceeds a selected critical glitch peak ratio, and
   a ratio of ramptime to clock period that exceeds a selected critical ramptime ratio.

20. The computer program product of claim 17 wherein step (c) comprises identifying crosstalk critical nets as a function of a single crosstalk risk factor.

21. The computer program product of claim 20 wherein the function of a single crosstalk risk factor comprises an exponentially weighted product of at least two of:
   a ratio of net length to critical length,
   a ratio of coupling capacitance to critical coupling capacitance,
   a ratio of glitch peak to supply voltage, and
   a ratio of ramptime to clock period.

22. The computer program product of claim 20 wherein step (c) comprises identifying crosstalk critical nets as a function of incremental crosstalk delay.

* * * * *